(12) United States Patent
Iwasaki et al.

(10) Patent No.: US 9,110,400 B2
(45) Date of Patent: Aug. 18, 2015

(54) CHARGING MEMBER, CHARGING DEVICE, DETACHABLE BODY, AND IMAGE FORMING APPARATUS

(71) Applicant: FUJI XEROX CO., LTD., Minato-ku, Tokyo (JP)

(72) Inventors: Jin Iwasaki, Kangawa (JP); Noriaki Kojima, Kanagawa (JP); Yoshinori Takahashi, Kanagawa (JP); Kei Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 117 days.

(21) Appl. No.: 13/771,675

(22) Filed: Feb. 20, 2013

(65) Prior Publication Data

US 2014/0056619 A1 Feb. 27, 2014

(30) Foreign Application Priority Data

Aug. 22, 2012 (JP) ................................. 2012-183668

(51) Int. Cl.
G03G 15/02 (2006.01)
G03G 15/05 (2006.01)
H02J 7/00 (2006.01)

(52) U.S. Cl.
CPC ............ *G03G 15/05* (2013.01); *G03G 15/0233* (2013.01); *H02J 7/0042* (2013.01)

(58) Field of Classification Search
USPC .......................................... 399/174, 168, 176
See application file for complete search history.

(56) References Cited

U.S. PATENT DOCUMENTS

| | | | | | |
|---|---|---|---|---|---|
| 5,168,309 | A | * | 12/1992 | Adachi et al. ................. | 399/174 |
| 5,353,101 | A | * | 10/1994 | Adachi et al. ................. | 399/174 |
| 5,390,007 | A | * | 2/1995 | Kugoh et al. ................. | 399/176 |
| 5,581,329 | A | * | 12/1996 | Kosmider et al. ............. | 399/176 |
| 5,634,179 | A | * | 5/1997 | Umeda et al. ................. | 399/174 |
| 5,790,927 | A | * | 8/1998 | Ando et al. ................... | 399/176 |
| 5,822,658 | A | * | 10/1998 | Tanaka et al. ................. | 399/174 |
| 5,839,029 | A | * | 11/1998 | Kataoka et al. ............... | 399/115 |
| 5,982,606 | A | * | 11/1999 | Masuda et al. ................ | 361/225 |
| 6,004,669 | A | * | 12/1999 | Rokutan et al. ............... | 428/335 |
| 7,664,433 | B2 | * | 2/2010 | Fujita et al. ................... | 399/174 |
| 7,787,804 | B2 | * | 8/2010 | Yamamoto ..................... | 399/174 |
| 2002/0154922 | A1 | * | 10/2002 | Ohno et al. .................... | 399/174 |
| 2004/0213600 | A1 | * | 10/2004 | Watanabe et al. ............. | 399/159 |
| 2005/0013631 | A1 | * | 1/2005 | Nishihama et al. ........... | 399/174 |
| 2007/0217823 | A1 | * | 9/2007 | Kuroda et al. ................. | 399/174 |
| 2008/0152385 | A1 | * | 6/2008 | Fujita et al. ................... | 399/111 |
| 2012/0045251 | A1 | * | 2/2012 | Jeon et al. ..................... | 399/174 |
| 2012/0148308 | A1 | * | 6/2012 | Imamura ....................... | 399/174 |
| 2012/0148309 | A1 | * | 6/2012 | Oshima et al. ................ | 399/174 |

FOREIGN PATENT DOCUMENTS

| | | |
|---|---|---|
| JP | 04-168453 A | 6/1992 |
| JP | 05-027551 A | 2/1993 |
| JP | 2005-208291 A | 8/2005 |

\* cited by examiner

*Primary Examiner* — G. M. Hyder
(74) *Attorney, Agent, or Firm* — Sughrue Mion, PLLC (57) ABSTRACT

A charging member includes a contact section and a supported section. The contact section is in contact with a charged body. The supported section is integrated with the contact section and is supported by a support member. The supported section has a lower hardness than the contact section.

1 Claim, 7 Drawing Sheets

| | FIRST COMPARATIVE EXAMPLE | SECOND COMPARATIVE EXAMPLE | THIRD COMPARATIVE EXAMPLE | | FOURTH COMPARATIVE EXAMPLE | | EXAMPLE | |
|---|---|---|---|---|---|---|---|---|
| | | | DOUBLE LAYER | | DOUBLE LAYER | | DOUBLE LAYER | |
| JIS-A HARDNESS | SINGLE LAYER | SINGLE LAYER | EDGE SECTION | SUPPORTED SECTION | EDGE SECTION | SUPPORTED SECTION | EDGE SECTION | SUPPORTED SECTION |
| | 90° | 59° | 59° | 90° | 63° | 81° | 90° | 59° |
| CHARGING NON-UNIFORMITY AT INITIAL STAGE CAUSED BY EDGE VIBRATION | 10 V (○) | 172 V (X) | 180 V (X) | | 142 V (X) | | 12 V (○) | |
| AMOUNT OF DETERIORATION IN CHARGING NON-UNIFORMITY AFTER FORMING IMAGES ON 30,000 RECORDING MEDIA FROM INITIAL STAGE | 189 V | 17 V | 179 V | | 71 V | | 16 V | |
| CHARGING NON-UNIFORMITY AFTER FORMING IMAGES ON 30,000 RECORDING MEDIA | 199 V (X) | 189 V (X) | 359 V (X) | | 213 V (X) | | 28 V (○) | |

CHARGING MEMBER, CHARGING DEVICE, DETACHABLE BODY, AND IMAGE FORMING APPARATUS

CROSS-REFERENCE TO RELATED APPLICATIONS

This application is based on and claims priority under 35 USC 119 from Japanese Patent Application No. 2012-183668 filed Aug. 22, 2012.

BACKGROUND

Technical Field

The present invention relates to charging members, charging devices, detachable bodies, and image forming apparatuses.

SUMMARY

According to an aspect of the invention, there is provided a charging member including a contact section and a supported section. The contact section is in contact with a charged body. The supported section is integrated with the contact section and is supported by a support member. The supported section has a lower hardness than the contact section.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

Configuration of Image Forming Apparatus 10

Figure 1:
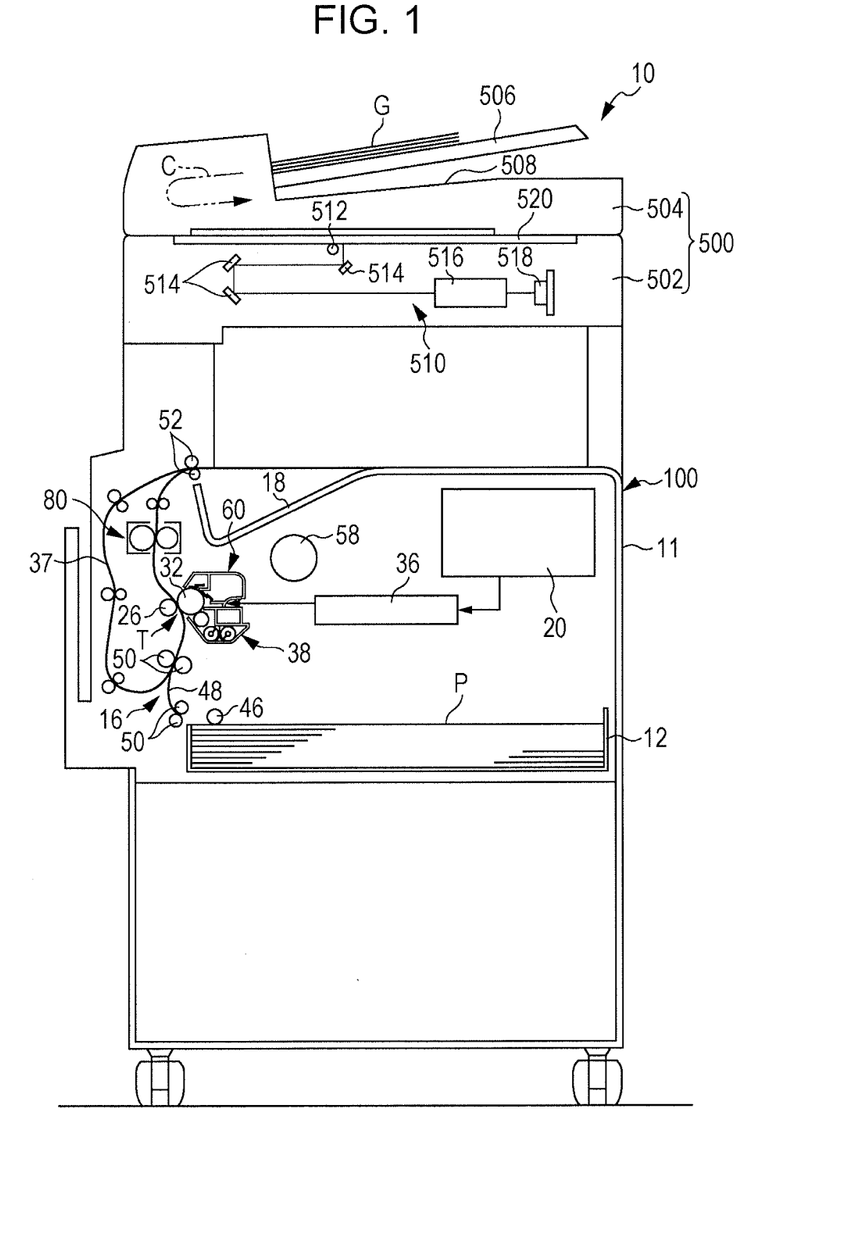
FIG. 1 schematically illustrates the configuration of an image forming apparatus according to an exemplary embodiment.

First, the configuration of an image forming apparatus 10 will be described. FIG. 1 schematically illustrates the configuration of the image forming apparatus 10.

As shown in FIG. 1, the image forming apparatus 10 includes an image reading device 500 that reads an image of a document and an image recording device 100 that records the image onto a recording medium P. The image recording device 100 is capable of recording (forming) an image onto the recording medium P on the basis of image data of the document image read by the image reading device 500 or image data acquired from an external device of the image forming apparatus 10.

Image Reading Device 500

As shown in FIG. 1, the image reading device 500 includes an image-reading-device body 502, a document transport device 504 that transports a document G, and an image reading section 510 that is provided within the image-reading-device body 502 and reads an image from the document G transported by the document transport device 504.

The document transport device 504 has a document accommodation section (i.e., a document tray) 506 that can accommodate multiple documents G. Each document G accommodated in the document accommodation section (document tray) 506 is transported along a U-shaped path indicated by a direction of an arrow C so as to be output to a document output section 508. In the image reading section 510, light is emitted by a light emitting section 512 to the document G transported by the document transport device 504 and is reflected by the document G. The light is then focused on a detector 518, such as a charge-coupled-device (CCD) image sensor, via multiple mirrors 514 and an imaging lens 516. The focused light is detected by the detector 518, whereby the image on the document G transported by the document transport device 504 is read in the image reading section 510.

A transparent plate 520 is provided at an upper portion of the image-reading-device body 502. An image of a document placed on this transparent plate 520 can also be read by the image reading section 510. The document transport device 504 is attached to the image-reading-device body 502 in an openable-closable manner and functions as a holding cover that holds in place the document placed on the transparent plate 520.

Image Recording Device 100

As shown in FIG. 1, the image recording device 100 includes an image-recording-device body 11 that accommodates components therein. The image-recording-device body 11 contains therein an accommodation section 12 that accommodates recording media P, such as paper, an image forming unit 60 as an image forming section (i.e., an image recording section) that forms (records) an image onto each recording medium P, a fixing unit 80 as a fixing device that fixes the image formed on the recording medium P by the image forming unit 60 onto the recording medium P, a transport section 16 that transports the recording medium P from the accommodation section 12 to the image forming unit 60, and a controller 20 that controls the operation of each section of the image recording device 100. An output section 18 to which the recording medium P having the image fixed thereon by the fixing unit 80 is output is provided at an upper portion of the image-recording-device body 11.

Figure 2:
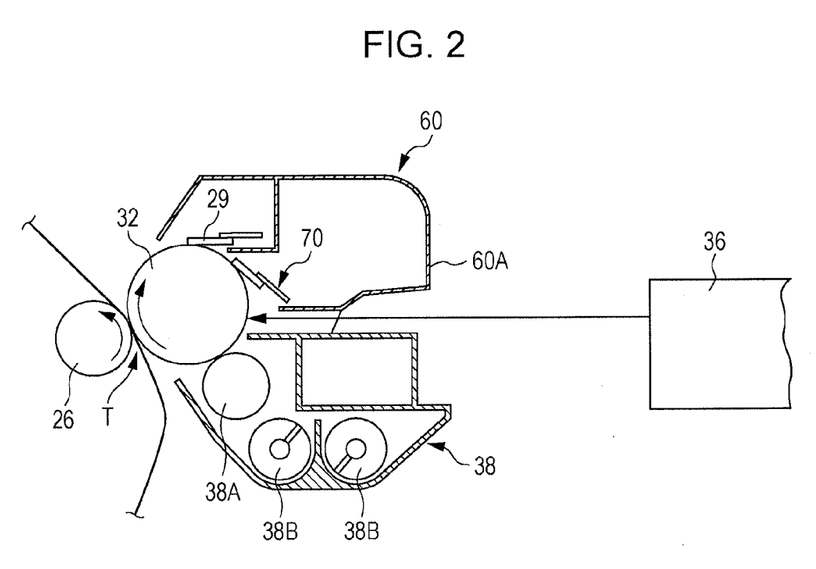
FIG. 2 schematically illustrates the configuration of an image forming unit according to an exemplary embodiment.

The image forming unit 60 is configured as a replaceable process cartridge and functions as an example of a detachable body that allows a photoconductor drum 32, a charging device 70, an exposure device 36, and a developing device 38, which will be described later, to be integrally attachable to and detachable from the image-recording-device body 11 (as an example of an image-forming-apparatus body). As shown in FIG. 2, the image forming unit 60 has an image-forming-unit body (i.e., a housing) 60A that is attachable to and detachable from the image-recording-device body 11. The image-forming-unit body 60A is provided with the photoconductor drum 32 as an example of a charged body. The photoconductor drum 32 rotates in one direction (e.g., in the clockwise direction in FIG. 2).

In the following order from the upstream side of the photoconductor drum 32 in the rotational direction thereof, the photoconductor drum 32 is surrounded by the charging device 70 that electrostatically charges the photoconductor drum 32, the exposure device 36 that exposes the photoconductor drum 32 electrostatically charged by the charging device 70 to light so as to form an electrostatic latent image on the photoconductor drum 32, the developing device 38 that develops the electrostatic latent image formed on the photoconductor drum 32 by the exposure device 36 so as to form a black toner image, a transfer roller 26 as a transfer section that transfers the black toner image formed on the photoconductor drum 32 by the developing device 38 onto the recording medium P, and a removing device 29 that removes residual toner from the photoconductor drum 32 after the toner-image transfer process. A detailed configuration of the charging device 70 will be described later.

The developing device 38 includes transport members 38B that transport a developer in the axial direction of the photoconductor drum 32 while stirring the developer, and a developing roller 38A as a developer supply body that retains the developer transported by the transport members 38B and supplies the developer to the photoconductor drum 32.

As shown in FIG. 1, the exposure device 36 forms the electrostatic latent image on the basis of an image signal (i.e., image data) sent from the controller 20. Examples of the image signal sent from the controller 20 include an image signal of the document image read by the image reading device 500 and an image signal acquired from the external device of the image forming apparatus 10.

A toner cartridge 58 as a toner container that accommodates toner therein is provided above the exposure device 36. The toner in the toner cartridge 58 is transported to the developing device 38 by a toner transport device (not shown).

The transfer roller 26 is opposed to the photoconductor drum 32 and nips the recording medium P together with the photoconductor drum 32 so as to transport the recording medium P upward. Furthermore, the transfer roller 26 receives a transfer voltage (i.e., a transfer bias) for transferring the toner image on the photoconductor drum 32 onto the recording medium P. A transfer position T where the toner image formed on the photoconductor drum 32 is transferred onto the recording medium P is formed between the transfer roller 26 and the photoconductor drum 32.

As shown in FIG. 2, the removing device 29 is specifically constituted of a cleaning blade as a removing member that comes into contact with the photoconductor drum 32 so as to remove residual toner from the photoconductor drum 32.

As shown in FIG. 1, the transport section 16 includes a feed roller 46 that feeds each recording medium P accommodated in the accommodation section 12, a transport path 48 along which the recording medium P fed by the feed roller 46 is transported, and multiple transport rollers 50 that are arranged along the transport path 48 and transport the recording medium P fed by the feed roller 46 to the transfer position T.

The fixing unit 80 is disposed above the transfer position T (i.e., at the downstream side thereof in the transport direction) and fixes the toner image transferred on the recording medium P from the photoconductor drum 32 by the transfer roller 26 onto the recording medium P. An output roller 52 that outputs the recording medium P having the toner image fixed thereon onto the output section 18 is provided above the fixing unit 80 (i.e., at the downstream side thereof in the transport direction).

An inversion transport path 37 that inverts the recording medium P having the toner image fixed on one face thereof so as to transport the recording medium P again to the transfer position T is provided at the opposite side (i.e., the left side in FIG. 1) of the photoconductor drum 32 relative to the transfer roller 26. When forming images onto both faces of the recording medium P, the recording medium P having the toner image fixed on one face thereof is guided to the inversion transport path 37 by being switched back by the output roller 52 so as to be transported again to the transfer position T.

Image Forming Operation

Next, an image forming operation (image recording operation) for forming (recording) an image onto the recording medium P in the image recording device 100 will be described.

In the image recording device 100, a recording medium P fed from the accommodation section 12 by the feed roller 46 is transported to the transfer position T by the multiple transport rollers 50.

In the image forming unit 60, the photoconductor drum 32 is electrostatically charged by the charging device 70 and is subsequently exposed to light by the exposure device 36, whereby an electrostatic latent image is formed on the photoconductor drum 32. The electrostatic latent image is developed by the developing device 38 so that a black toner image is formed on the photoconductor drum 32. This black toner image is transferred onto the recording medium P by the transfer roller 26 at the transfer position T.

The recording medium P having the toner image transferred thereon is transported to the fixing unit 80, and the toner image is fixed onto the recording medium P by the fixing unit 80. If an image is to be formed only on one face of the recording medium P, the recording medium P, after having the toner image fixed thereon, is output to the output section 18 by the output roller 52.

If images are to be formed on both faces of the recording medium P, the recording medium P, after having the toner image fixed on one face thereof, is switched back by the output roller 52 and is inverted and transported to the inversion transport path 37. Then, the recording medium P is transported again to the transfer position T from the inversion transport path 37. At the transfer position T, an image is formed on the non-image-recorded face of the recording medium P in a manner similar to the above procedure. The recording medium P is then output to the output section 18 by the output roller 52. Accordingly, the image forming operation is performed in the above-described manner.

An image recording device (image forming apparatus) to which the charging device 70 is applied is not limited to the image recording device 100 (image forming apparatus 10) described above, and may alternatively be image recording devices (image forming apparatuses) of various types, such as a tandem-type image recording device (image forming apparatus) that forms a color image.

Configuration of Charging Device 70

Figure 3:
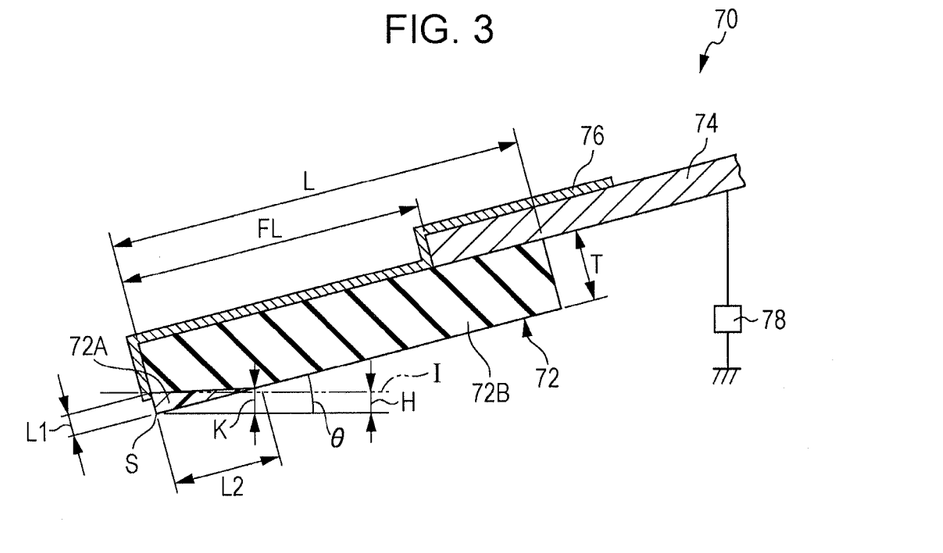
FIG. 3 is a cross-sectional view illustrating the configuration of a charging device according to an exemplary embodiment.

Next, the configuration of the charging device 70 will be described. FIG. 3 is a cross-sectional view illustrating the configuration of the charging device 70.

As shown in FIG. 3, the charging device 70 includes a charging blade 72 as an example of a charging member, a support member 74 that supports the charging blade 72, a power source 78 that applies a charge voltage to the support member 74, and electrically conductive paste 76 as an electrically conductive member.

The charging blade 72 includes an edge section 72A (corner section) as an example of a contact section that is in contact with the photoconductor drum 32 (as an example of a charged member), and a supported section 72B that is integrated with the edge section 72A and is supported by the support member 74.

The charging blade 72 is rectangular in a side view (i.e., a cross-sectional view) and has a thickness T ranging between, for example, 1 mm and 3 mm and a length L ranging between, for example, 9 mm and 15 mm. Furthermore, the charging blade 72 has a free length FL ranging between, for example, 7 mm and 10 mm. An amount H by which the charging blade 72 digs into the photoconductor drum 32 ranges between 0.5 mm and 2.0 mm. An angle θ of the charging blade 72 relative to the surface of the photoconductor drum 32 ranges between, for example, 10° and 25°.

The term "free length FL" refers to a length by which the charging blade 72 protrudes from a tip (i.e., the left tip in FIG. 3) of the support member 74. Furthermore, referring to FIG. 3, the term "amount H by which the charging blade 72 digs into the photoconductor drum 32" refers to a distance (in the radial direction of the photoconductor drum 32) between an imaginary line I of the outer periphery of the photoconductor drum 32 and an edge S that penetrates into the imaginary line I, supposing that the photoconductor drum 32 is not present.

In a side view (i.e., a cross-sectional view), the edge section 72A has a triangular shape with a length L1 of, for example, 0.5 mm in the thickness direction of the charging blade 72 and a length L2 of, for example, 2.5 mm.

The supported section 72B has a lower hardness than the edge section 72A. In other words, the edge section 72A has a higher hardness than the supported section 72B. The JIS-A hardness of the edge section 72A may be 84° or higher. As will be described later, if the aforementioned hardness is lower than 84°, the charging would become non-uniform at the initial stage of operation due to vibration occurring in a portion of the edge section 72A that is in contact with the photoconductor drum 32.

The JIS-A hardness of the supported section 72B may be 74° or lower. As will be described later, if the aforementioned hardness exceeds 74°, the charging non-uniformity would further deteriorate from the initial stage due to yielding of the charging blade 72.

In this exemplary embodiment, the edge section 72A has conductive properties, and the supported section 72B has insulation properties, such that discharging toward the photoconductor drum 32 is performed at the edge section 72A. In detail, discharging is performed at the downstream side (i.e., the right side in FIG. 3) of the photoconductor drum 32 in the rotational direction thereof relative to the portion (i.e., the edge S) of the edge section 72A that is in contact with the photoconductor drum 32.

The edge section 72A is specifically composed of a rubber material having conductive properties. More specifically, the edge section 72A is composed of a rubber material with a conductivity adding material, such as carbon or ion conductive material, dispersed therein. An example of the rubber material used includes polyurethane rubber. The term "conductive properties" in this case refers to a volume resistivity range of $10^{10}$ Ωcm or lower. In view of performing discharging, the volume resistivity of the edge section 72A may range between $10^4$ Ωcm and $10^8$ Ωcm.

The supported section 72B is specifically composed of a rubber material having insulation properties. More specifically, the supported section 72B is composed of a rubber material not having the aforementioned conductivity adding material dispersed therein. An example of the rubber material used includes polyurethane rubber. The term "insulation properties" in this case refers to a volume resistivity range of $10^{11}$ Ωcm or higher.

Furthermore, the polyurethane rubber material used for forming each of the edge section 72A and the supported section 72B is, for example, a polyurethane composition containing polyisocyanate and polyol. The polyol used is, for example, polycaprolactonepolyol, polyester polyol, or polyether polyol.

The polyisocyanate used in the edge section 72A is, for example, 1,5-naphthalene diisocyanate (NDI). A suitable polyol used relative to the 1,5-naphthalene diisocyanate (NDI) is polycaprolactonepolyol. 1,5-naphthalene diisocyanate (NDI) has a rigid structure and a sufficient crystalline height. By utilizing this structure for forming polyurethane, polyurethane with a high hardness is obtained.

The polyisocyanate used in the supported section 72B is, for example, 4,4'-diphenylmethane diisocyanate (MDI). Other alternatives include diisocyanates, such as 4,4'-dicyclohexylmethane diisocyanate (hydrogenated MDI), carbodiimide-modified MDI, 2,4-tolylene diisocyanate (2,4-TDI), 2,6-tolylene diisocyanate (2,6-TDI), 3,3'-bitolylene-4,4'-diisocyanate, 3,3'-dimethyldiphenylmethane-4,4'-diisocyanate, 2,4-tolylene diisocyanate uretidinedione (i.e., dimer of 2,4-TDI), metaphenylene diisocyanate, hexamethylene diisocyanate, isophorone diisocyanate, ortho-toluidine diisocyanate, xylene diisocyanate, paraphenylene diisocyanate, and lysine diisocyanate methyl ester; triisocyanates, such as triphenylmethane-4,4',4"-triisocyanate; and polymeric MDI. One of these materials may be used alone or two or more of these materials may be combined.

The charging blade 72 is formed by, for example, the following manufacturing method and is integrally constituted of the supported section 72B and the edge section 72A that have different hardnesses.

The manufacturing method for the charging blade 72 includes, for example, using a first casting unit to supply a liquid material for the edge section 72A to a corner area of a molding groove formed around the outer periphery of a rotating molding drum and then using a second casting unit to supply a liquid material for the supported section 72B to the molding groove. Subsequently, a strip-shaped molded product obtained as a result of thermosetting the two liquid materials by using a heating device provided inside the molding drum is cut, whereby the charging blade 72 is obtained. The manufacturing method for the charging blade 72 is not limited to the one described above, and various kinds of manufacturing methods may be employed.

In the configuration using the charging blade 72 as in this exemplary embodiment, discharging is generally performed in an area (i.e., a discharge area) where the gap between the charging blade 72 and the photoconductor drum 32 is about 8 μm to 200 μm.

Therefore, in this exemplary embodiment, the amount H by which the charging blade 72 digs into the photoconductor drum 32, the angle θ, the length L2, and so on are determined so that the gap between the edge section 72A and the photoconductor drum 32 is within the aforementioned range and so that better processability is achieved for the charging blade 72. A gap K (in the radial direction of the photoconductor drum 32) between the photoconductor drum 32 and the downstream end (i.e., the right end in FIG. 3) of the edge section 72A in the rotational direction of the photoconductor drum 32 is, for example, 1 mm.

In detail, at a position where the length L2 from the edge S is about 500 μm, the gap between the edge section 72A and the photoconductor drum 32 is about 200 μm, and discharging is made to occur at the edge-S side from the aforementioned 500 μm, position. Therefore, from the standpoint of maintaining a gap that allows for discharging, the length L2 may be shorter than 2.5 mm and may be set in a range in which a gap that allows for discharging between the edge section 72A and the photoconductor drum 32 can be maintained.

The length L2 may be set to be longer from the standpoint of the processability of the charging blade 72 (i.e., the edge section 72A). In this exemplary embodiment, the length L2 is set to a sufficiently large value of 2.5 mm in view of better processability in the manufacturing process.

For suppressing charging non-uniformity caused by yielding, to be described later, the overall hardness of the charging blade 72 may be reduced by increasing the region of the supported section 72B, and the length L2 may be shortened.

The length L1 is not limited to 0.5 mm mentioned above and may be, for example, smaller than or equal to half the thickness T of the charging blade 72. If the length L1 exceeds half of the thickness T of the charging blade 72, the length L1 would occupy a larger region of the supported section 72B, thus making it difficult to maintain the overall hardness of the charging blade 72 to a low value. This would result in a reduced effect for suppressing charging non-uniformity caused by yielding.

The support member 74 is a tabular member extending longitudinally in the axial direction of the photoconductor drum 32. The support member 74 has a function of supporting the charging blade 72 onto the image-forming-unit body (charging device body) 60A (see FIG. 2) and also functions as an electrode that receives a charge voltage from the power source 78. The support member 74 is composed of, for example, metal or an alloy, such as a copper alloy or SUS, iron plated with chromium or nickel, or an electrically conductive material, such as synthetic resin.

The electrically conductive paste 76 functions as an electrically connecting member for electrically connecting the support member 74 to the discharge area in the charging blade 72. In this exemplary embodiment, the edge section 72A serves as the discharge area. The electrically conductive paste 76 extends from a back surface (i.e., a surface (upper surface in FIG. 3) opposite the photoconductor drum 32) of the support member 74 to the edge section 72A via an end surface (i.e., a left end surface in FIG. 3) of the support member 74, a back surface (i.e., a surface (upper surface in FIG. 3) opposite the photoconductor drum 32) of the charging blade 72 (i.e., the supported section 72B), and an end surface (i.e., a left end surface in FIG. 3) of the charging blade 72 (i.e., the supported section 72B).

Figure 4:
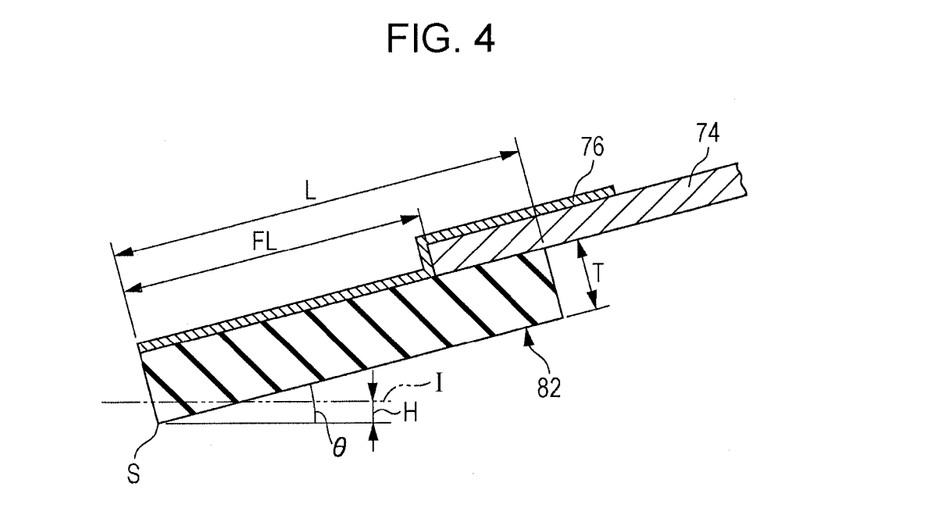
FIG. 4 is a cross-sectional view illustrating the configuration of a charging device according to a comparative example equipped with a single-layer charging blade.

Relationship Between Hardness of Charging Blade and Amplitude of Vibration at Edge and Relationship Between Hardness of Charging Blade and Charging Non-Uniformity at Initial Stage Caused by Edge Vibration The following description relates to the relationship between the hardness of a charging blade and the amplitude of vibration occurring at the portion (i.e., the edge S) thereof in contact with the photoconductor drum 32 and the relationship between the hardness of the charging blade and charging non-uniformity at an initial stage caused by vibration occurring at the portion (i.e., the edge S) thereof in contact with the photoconductor drum 32. The results obtained here correspond to a case where a single-layer charging blade 82 is used, as shown in FIG. 4. This single-layer blade is also composed of a rubber material having conductive properties. More specifically, the blade is composed of a rubber material with a conductivity adding material, such as carbon or ion conductive material, dispersed therein. An example of the rubber material used includes polyurethane rubber. The term "conductive properties" in this case refers to a volume resistivity range of $10^{10}$ Ωcm or lower. In view of performing discharging, the volume resistivity may range between $10^4$ Ωcm and $10^8$ Ωcm.

Figure 5A:
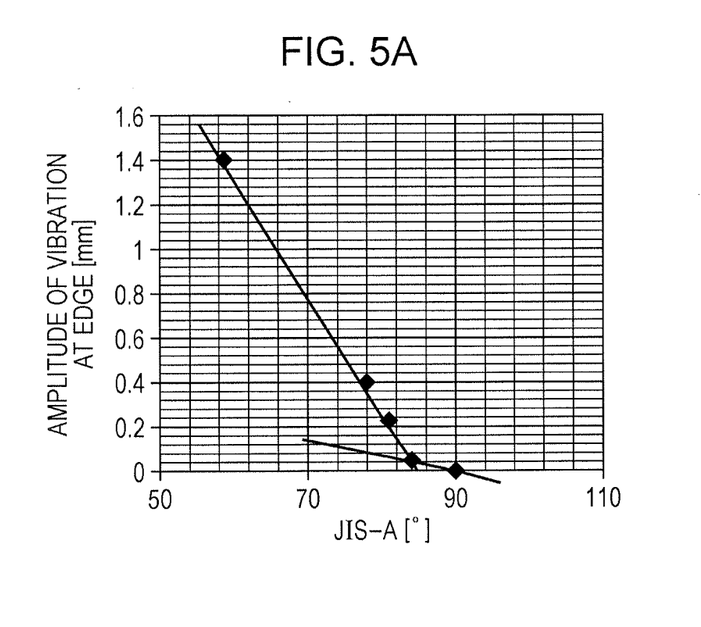
FIG. 5A is a graph illustrating the relationship between the hardness of a charging blade and the amplitude of vibration at an edge of the charging blade.

As shown in a graph in FIG. 5A, the higher the hardness of the charging blade, the smaller the amplitude (vibration) at the edge S. Furthermore, as shown in a graph in FIG. 5B, the higher the hardness of the charging blade, the smaller the charging non-uniformity at the initial stage caused by vibration at the edge S. In the graphs in FIGS. 5A and 5B, an inflection point where the inclination changes corresponds to a JIS-A hardness of 84°. Specifically, in a charging blade with a JIS-A hardness of 84° or higher, the effect for suppressing charging non-uniformity at the initial stage caused by vibration at the edge S is high.

The term "charging non-uniformity at the initial stage" refers to charging non-uniformity at the initial stage of operation of the device (the same applies throughout this specification). The term "amplitude of vibration" in FIG. 5A corresponds to a displacement amount (mm) of the edge S that vibrates in the radial direction of the photoconductor drum 32 as the photoconductor drum 32 rotates. The term "charging non-uniformity" in the graph in FIG. 5B corresponds to charging non-uniformity in the rotational direction of the photoconductor drum 32 and is measured by measuring the surface potential of the rotating photoconductor drum 32 (the same applies throughout this specification).

The vibration (amplitude) in this case corresponds to vibration occurring at the portion (i.e., the edge S) of the charging blade that is in contact with the photoconductor drum 32. This portion is a very narrow area that has an effect on discharging. In other words, this vibration is different from high-frequency vibration occurring in a large area, as in a stick-slip phenomenon in a cleaning blade. A stick-slip phenomenon is a phenomenon in which a blade repeatedly undergoes a process of being deformed by being pulled downstream in the rotational direction of a photoconductor drum due to a frictional force between the blade and the photoconductor drum and then restoring its original form due to an elastic force of the blade.

Figure 5B:
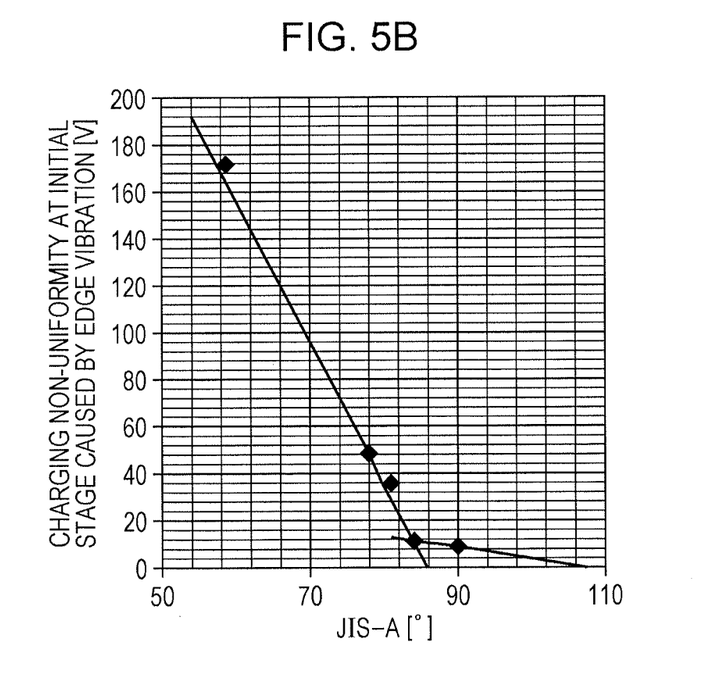
FIG. 5B is a graph illustrating the relationship between the hardness of the charging blade and charging non-uniformity at an initial stage caused by vibration occurring at the edge of the charging blade.

Accordingly, it is obvious from the graphs in FIGS. 5A and 5B that the higher the hardness of the charging blade, the smaller the vibration occurring at the portion (i.e., the edge S) thereof in contact with the photoconductor drum 32 and the smaller the charging non-uniformity at the initial stage caused by the vibration.

Relationship Between Hardness of Charging Blade and Amount of Yielding in Charging Blade and Relationship Between Hardness of Charging Blade and how Much Charging Non-Uniformity has Deteriorated Since Initial Stage Due to Yielding The following description relates to the relationship between the hardness of a charging blade and the amount of yielding in the charging blade and the relationship between the hardness of the charging blade and how much charging non-uniformity has deteriorated since the initial stage due to yielding. The results obtained here correspond to a case where the single-layer charging blade 82 is used, as shown in FIG. 4.

The term "yielding" refers to decreasing of the amount H by which the charging blade digs into the photoconductor drum 32 over time, and the term "amount of yielding" refers to an amount by which the aforementioned amount H has decreased with time (the same applies throughout this specification). The results here are obtained by measuring an amount of yielding after forming images on 30,000 recording media P and also by measuring how much the charging non-uniformity has deteriorated since the initial stage due to yielding.

Figure 6A:
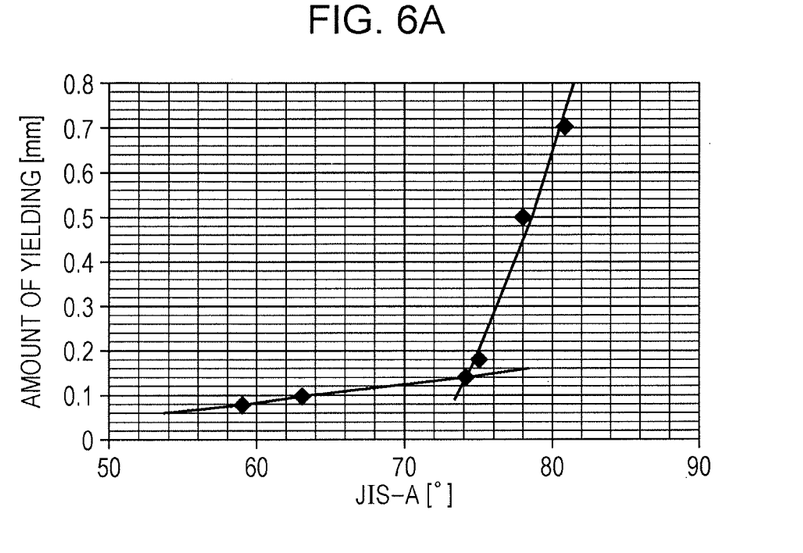
FIG. 6A is a graph illustrating the relationship between the hardness of the charging blade and an amount of yielding in the charging blade.

As shown in a graph in FIG. 6A, the higher the hardness of the charging blade, the larger the amount of yielding. Furthermore, as shown in a graph in FIG. 6B, the higher the hardness of the charging blade, the larger the amount of deterioration in charging non-uniformity since the initial stage due to yielding. The amount of deterioration in charging non-uniformity since the initial stage due to yielding corresponds to a value obtained by subtracting the charging non-uniformity value at the initial stage shown in FIG. 5B from the charging non-uniformity value after forming images on 30,000 recording media P.

The charging non-uniformity conceivably deteriorates with time due to the following reason. A pressure-contact force of the charging blade against the photoconductor drum 32 weakens due to yielding of the charging blade. This causes foreign matter, such as an external additive, contained in the toner on the photoconductor drum 32 to penetrate between the edge S of the charging blade and the photoconductor drum 32 and adhere to an area (i.e., a discharge surface) in the charging blade where discharging is performed for the photoconductor drum 32. Therefore, the amount of deterioration in charging non-uniformity after forming images on 30,000 recording media P is expressed as an amount of deterioration in charging non-uniformity occurring due to the adhesion of foreign matter, such as an external additive, to the charging blade, which is caused by yielding of the charging blade.

Figure 6B:
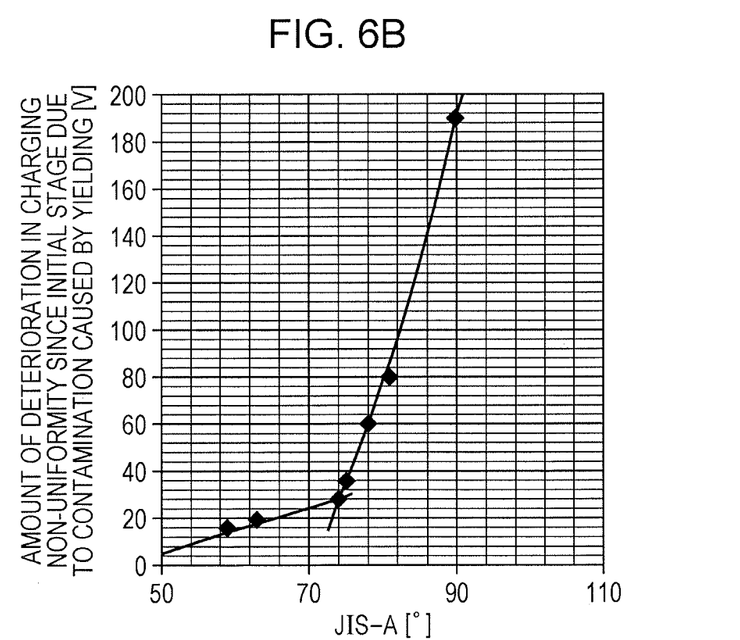
FIG. 6B is a graph illustrating the relationship between the hardness of the charging blade and how much charging non-uniformity has deteriorated since an initial stage due to yielding of the charging blade.

In the graphs in FIGS. 6A and 6B, an inflection point where the inclination changes corresponds to a JIS-A hardness of 74°. Specifically, in a charging blade with a JIS-A hardness of 74° or lower, the effect for suppressing deterioration in charging non-uniformity caused by yielding is high.

Accordingly, it is obvious from the graphs in FIGS. 6A and 6B that the higher the hardness of the charging blade, the larger the amount of yielding in the charging blade and the larger the charging non-uniformity caused by the yielding.

Evaluations

With regard to each of charging blades according to an example and first to fourth comparative examples, the charging non-uniformity at the initial stage caused by vibration occurring at the portion (i.e., the edge S) of the edge section 72A in contact with the photoconductor drum 32, the amount of deterioration in charging non-uniformity occurring due to yielding after forming images on 30,000 recording media P from the initial stage, and the charging non-uniformity after forming images on 30,000 recording media P are evaluated.

Configuration of Charging Blade

In each of the first and second comparative examples, a single-layer charging blade is used, as shown in FIG. 4. The charging blade is composed of polyurethane rubber with an ion conductive material dispersed therein.

In each of the third and fourth comparative examples and the example, a double-layer charging blade constituted of the edge section 72A and the supported section 72B is used, as shown in FIG. 3. The edge section 72A is composed of polyurethane rubber with an ion conductive material dispersed therein, and the supported section 72B is composed of polyurethane rubber not having a conductivity adding material dispersed therein.

In each of the first to fourth comparative examples and the example, the charging blade used has a thickness T ranging between 1.5 mm and 3 mm and a free length FL ranging between 7 mm and 9 mm. Moreover, the amount H by which the charging blade digs into the photoconductor drum ranges between 0.5 mm and 2.0 mm, and the angle θ between the charging blade and the surface of the photoconductor drum ranges between 10° and 25°.

The JIS-A hardness of the charging blade according to each of the first to fourth comparative examples and the example is set as follows.

First Comparative Example: 90°
Second Comparative Example: 59°
Third Comparative Example: 59° for Edge Section 72A and 90° for Supported Section 72B
Fourth Comparative Example: 63° for Edge Section 72A and 81° for Supported Section 72B
Example: 90° for Edge Section 72A and 59° for Supported Section 72B Evaluation Results As a result, in the first comparative example, the charging non-uniformity at the initial stage is small and is within a practicable charging non-uniformity range. However, the charging non-uniformity after forming images on 30,000 recording media P is large and exceeds the practicable charging non-uniformity range.

In the second to fourth comparative examples, the charging non-uniformity at the initial stage and the charging non-uniformity after forming images on 30,000 recording media P exceed the practicable charging non-uniformity range.

In contrast, in the example, the charging non-uniformity at the initial stage and the charging non-uniformity after forming images on 30,000 recording media P are within the practicable charging non-uniformity range.

Figure 7:
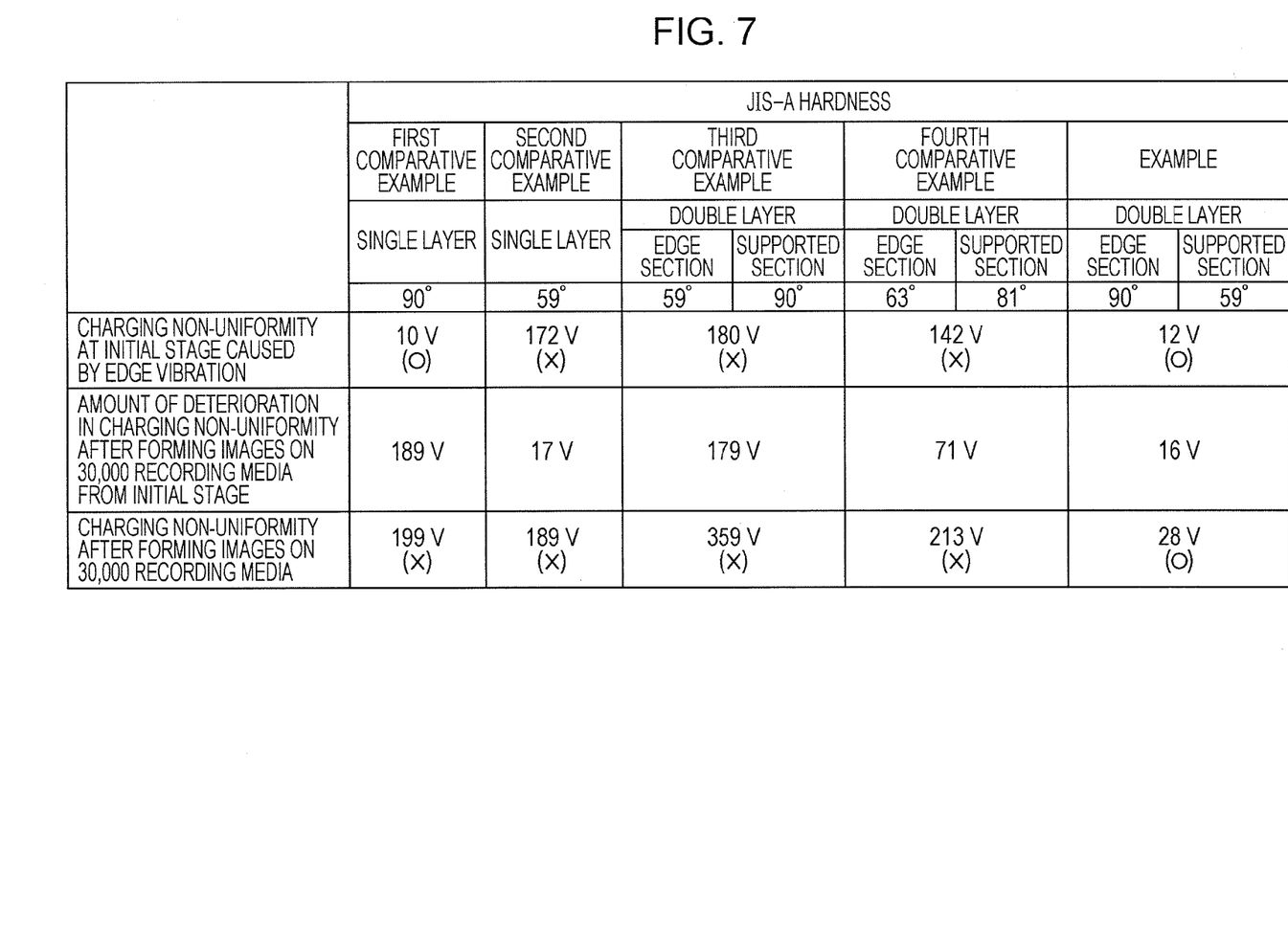
FIG. 7 is a table illustrating evaluation results of comparative examples and an example.

In the evaluation results shown in FIG. 7, a circle indicates that the charging non-uniformity at the initial stage and/or the charging non-uniformity after forming images on 30,000 recording media P is/are within the practicable charging non-uniformity range, and an "x" indicates that the charging non-uniformity at the initial stage and/or the charging non-uniformity after forming images on 30,000 recording media P exceed or exceeds the practicable charging non-uniformity range.

Accordingly, by using a charging blade 72 in which the edge section 72A has a higher hardness than the supported section 72B, the charging non-uniformity at the initial stage caused by vibration of the charging blade 72 and the charging non-uniformity caused by yielding occurring in the charging blade 72 over time may be suppressed.

Charging Blade 172 According to First Modification

Figure 8:
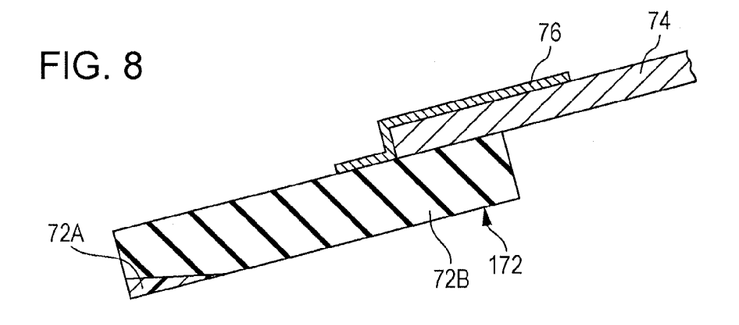
FIG. 8 is a cross-sectional view illustrating the configuration of a charging blade according to a first modification.

Next, a charging blade 172 according to a first modification will be described. FIG. 8 is a cross-sectional view illustrating the configuration of the charging blade 172 according to the first modification. The following description will be directed to sections that are different from those of the aforementioned charging blade 72. Furthermore, sections that have the same functions will be given the same reference numerals, and descriptions thereof will be omitted.

As shown in FIG. 8, in the charging blade 172 according to the first modification, the supported section 72B is composed of a material having conductive properties. Specifically, like the edge section 72A, the supported section 72B is composed of a rubber material having conductive properties. More specifically, the supported section 72B is composed of a rubber material with a conductivity adding material, such as carbon or ion conductive material, dispersed therein. An example of the rubber material used includes polyurethane rubber. The term "conductive properties" in this case refers to a volume resistivity range of $10^{10}$ Ωcm or lower.

In this modification, the edge section 72A is composed of polyurethane rubber with an ion conductive material dispersed therein. The supported section 72B is composed of polyurethane rubber with carbon black dispersed therein.

The electrically conductive paste 76 extends from the back surface (i.e., the surface (upper surface in FIG. 8) opposite the photoconductor drum 32) of the support member 74 to the back surface (i.e., the surface (upper surface in FIG. 8) opposite the photoconductor drum 32) of the charging blade 72 (i.e., the supported section 72B) via the end surface (i.e., the left end surface in FIG. 8) of the support member 74.

A configuration not provided with the electrically conductive paste 76 is also permissible. With the electrically conductive paste 76, an insulating material can be used as an adhesive layer (not shown) for adhering the support member 74 and the charging blade 72 to each other. The aforementioned adhesive layer may alternatively be composed of an electrically conductive material.

In view of performing discharging, the volume resistivity of the edge section 72A may range between $10^4$ Ωcm and $10^8$ Ωcm. Furthermore, in order to achieve a function for supplying electricity to the edge section 72A, the volume resistivity of the supported section 72B may range between $10^3$ Ωcm and $10^6$ Ωcm.

Charging Blade 272 According to Second Modification

Figure 9:
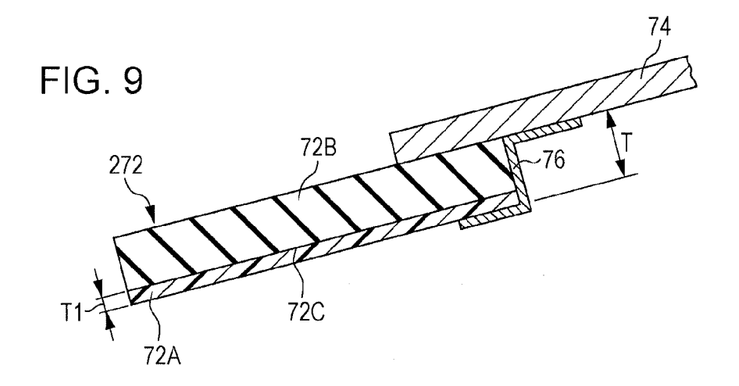
FIG. 9 is a cross-sectional view illustrating the configuration of a charging blade according to a second modification.

Next, a charging blade 272 according to a second modification will be described. FIG. 9 is a cross-sectional view illustrating the configuration of the charging blade 272 according to the second modification. The following description will be directed to sections that are different from those of the aforementioned charging blade 72. Furthermore, sections that have the same functions will be given the same reference numerals, and descriptions thereof will be omitted.

As shown in FIG. 9, in the charging blade 272 according to the second modification, an entire opposing surface 72C (i.e., a surface opposite a supported surface (joined surface) supported by the support member 74) of the supported section 72B that faces the photoconductor drum 32 is integrally provided with the edge section 72A. The supported section 72B and the edge section 72A are rectangular in a side view (i.e., a cross-sectional view).

For example, the edge section 72A may have a thickness T1 that is smaller than or equal to half the thickness T of the charging blade 72. If the thickness T1 exceeds half of the thickness T of the charging blade 72, the thickness T1 would occupy a larger region of the supported section 72B, thus making it difficult to maintain the overall hardness of the charging blade 72 to a low value. This would result in a reduced effect for suppressing charging non-uniformity caused by yielding.

The electrically conductive paste 76 extends from an opposing surface (i.e., a surface (lower surface in FIG. 9) opposite the back surface) of the support member 74 that faces the photoconductor drum 32 to the edge section 72A via a downstream end surface (i.e., a right end surface in FIG. 9) of the charging blade 72 (i.e., the supported section 72B) in the rotational direction of the photoconductor drum 32.

In view of performing discharging, the volume resistivity of the edge section 72A may range between $10^4$ Ωcm and $10^8$ Ωcm. The supported section 72B may have insulation properties since it does not have a function for supplying electricity to the edge section 72A.

Charging Blade 372 According to Third Modification

Figure 10:
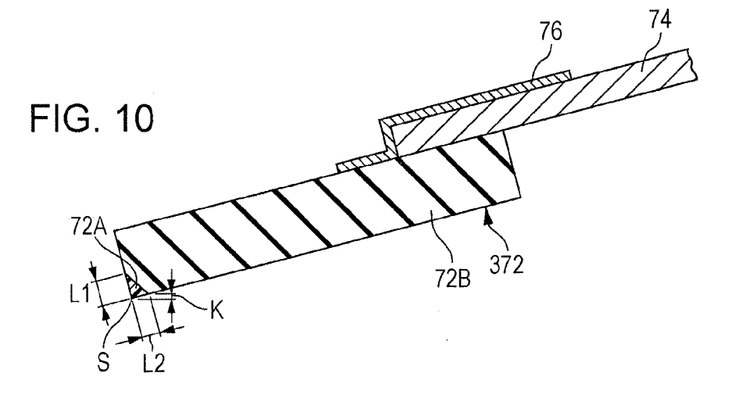
FIG. 10 is a cross-sectional view illustrating the configuration of a charging blade according to a third modification.

Next, a charging blade 372 according to a third modification will be described. FIG. 10 is a cross-sectional view illustrating the configuration of the charging blade 372 according to the third modification. The following description will be directed to sections that are different from those of the charging blade 172 according to the first modification. Furthermore, sections that have the same functions will be given the same reference numerals, and descriptions thereof will be omitted.

As shown in FIG. 10, in the charging blade 372 according to the third modification, the edge section 72A has a triangular shape, in a side view (i.e., a cross-sectional view), with a length L1 of, for example, 0.5 mm in the thickness direction of the charging blade 372 and a length L2 of, for example, 0.25 mm. In other words, the length L2 is shorter than that of the charging blade 172 (charging blade 72) according to the first modification.

In the third modification, the edge section 72A has insulation properties, and the supported section 72B has conductive properties, such that discharging toward the photoconductor drum 32 is performed at the supported section 72B.

In the third modification, the amount H by which the charging blade 372 digs into the photoconductor drum 32, the angle θ, the length L2, and so on are determined so that the gap between the supported section 72B and the photoconductor drum 32 allows for discharging (i.e., a gap of about 8 μm to 200 μm). A gap K (in the radial direction of the photoconductor drum 32) between the photoconductor drum 32 and the upstream end (i.e., a left end in FIG. 10) of the supported section 72B in the rotational direction of the photoconductor drum 32 is, for example, 50 μm. Therefore, discharging toward the photoconductor drum 32 is performed between the upstream end of the supported section 72B in the rotational direction of the photoconductor drum 32 and an area where the gap between the supported section 72B and the photoconductor drum 32 is equal to 200 μm.

The supported section 72B is specifically composed of a rubber material having conductive properties. More specifically, the supported section 72B is composed of a rubber material with a conductivity adding material, such as carbon or ion conductive material, dispersed therein. An example of the rubber material used includes polyurethane rubber. The term "conductive properties" in this case refers to a volume resistivity range of $10^{10}$ Ωcm or lower. In view of performing discharging, the volume resistivity of the supported section 72B may range between $10^4$ Ωcm and $10^8$ Ωcm.

The edge section 72A is specifically composed of a rubber material having insulation properties. More specifically, the edge section 72A is composed of a rubber material not having the aforementioned conductivity adding material dispersed therein. An example of the rubber material used includes polyurethane rubber. The term "insulation properties" in this case refers to a volume resistivity range of $10^{11}$ Ωcm or higher.

In this exemplary embodiment including the third modification, insulation between the photoconductor drum 32 and the edge S (edge section 72A) is maintained by a surface layer of the photoconductor drum 32 so that a leakage (i.e., an electrical breakdown) between the edge S and the photoconductor drum 32 is prevented from occurring. However, the edge S that vibrates by coming into contact with the rotating photoconductor drum 32 may possibly damage the surface layer of the photoconductor drum 32. Even in that case, since the edge section 72A has insulation properties in the third modification, the leakage (electrical breakdown) between the edge section 72A and the photoconductor drum 32 may be suppressed. Furthermore, with the edge section 72A having a high hardness in this exemplary embodiment, vibration thereof is minimized, whereby damage to the surface layer of the photoconductor drum 32 may be suppressed.

Furthermore, with the edge section 72A having insulation properties, discharging occurring between the edge section 72A and the photoconductor drum 32 is suppressed at the upstream side (left side in FIG. 10) of the edge S in the rotational direction. In other words, discharging is satisfactorily performed only at the downstream side of the edge S in the rotational direction of the photoconductor drum 32.

Other Modifications

Although the image recording device 100 is equipped with the removing device 29 that removes residual toner from the photoconductor drum 32, the charging blade 72 may alternatively be used as a removing device that removes residual toner from the photoconductor drum 32. In this case, the removing device 29 is not provided, and the charging blade 72 is configured to serve both as a charging device and a removing device.

The present invention is not limited to the exemplary embodiments described above, and various modifications, alterations, and variations are permissible. For example, with regard to the modifications described above, multiple modifications may be combined where appropriate.

What is claimed is:

1. A charging member comprising:
   a contact section that is in contact with a charged body rotating around an axis; and
   a supported section that is integrated with the contact section and is supported by a support member, the supported section having a lower hardness than the contact section,
   wherein the charging member is formed in a rectangular shape when viewed from a direction along the axis, and
   wherein a length in a thickness direction of the contact section of the charging member decreases continuously as a distance from an edge of the charging member in a length direction increases, the edge contacts with the charged body.

* * * * *